United States Patent
Park et al.

(10) Patent No.: US 9,350,675 B2
(45) Date of Patent: May 24, 2016

(54) APPARATUS AND METHOD FOR CONTROLLING TRAFFIC

(71) Applicant: NTELS CO., LTD., Seoul (KR)

(72) Inventors: Chan-Il Park, Seongnam-si (KR); Jae-Young Park, Seongnam-si (KR); Jae-Hee Shim, Seoul (KR)

(73) Assignee: NTELS Co., Ltd., Seoul (KR)

( * ) Notice: Subject to any disclaimer, the term of this patent is extended or adjusted under 35 U.S.C. 154(b) by 92 days.

(21) Appl. No.: 14/272,288

(22) Filed: May 7, 2014

(65) Prior Publication Data

US 2014/0334298 A1    Nov. 13, 2014

(30) Foreign Application Priority Data

May 8, 2013   (KR) .................. 10-2013-0052046

(51) Int. Cl.
    *H04L 12/26*     (2006.01)
    *H04L 12/851*    (2013.01)
    *H04L 12/801*    (2013.01)

(52) U.S. Cl.
    CPC ............... *H04L 47/24* (2013.01); *H04L 47/12* (2013.01)

(58) Field of Classification Search
    CPC ..................................................... H04L 47/28
    See application file for complete search history.

(56) References Cited

U.S. PATENT DOCUMENTS

| | | | |
|---|---|---|---|
| 2006/0233101 A1* | 10/2006 | Luft | H04L 47/20 370/229 |
| 2007/0058632 A1* | 3/2007 | Back | H04L 12/2602 370/392 |
| 2012/0078994 A1* | 3/2012 | Jackowski | H04L 47/19 709/202 |

FOREIGN PATENT DOCUMENTS

| | | |
|---|---|---|
| JP | 2002/094603 A | 3/2002 |
| KR | 2006/0068186 A | 10/2006 |
| KR | 2007/0052019 A | 5/2007 |

OTHER PUBLICATIONS

Notice of Allowance dated Jul. 18, 2004 in corresponding Korean Patent Application No. 10-2013-0052046.

* cited by examiner

*Primary Examiner* — Chi H Pham
*Assistant Examiner* — Fahmida Chowdhury
(74) *Attorney, Agent, or Firm* — Knobbe, Martens, Olson & Bear, LLP (57) ABSTRACT

An apparatus and a method for controlling traffic are disclosed. The apparatus for controlling traffic in accordance with the present invention includes: a communication unit configured to receive packets corresponding to a terminal; a service checking unit configured to check for a service corresponding to the packets by analyzing the packets; a terminal checking unit configured to analyze the packets and check a type of the terminal; a policy information storage unit configured to store policy information according to at least one of the service and the type of the terminal; and a traffic control unit configured to adjust a transmission rate of the packets corresponding to the service according to the policy information.

4 Claims, 6 Drawing Sheets

APPARATUS AND METHOD FOR CONTROLLING TRAFFIC

CROSS-REFERENCE TO RELATED APPLICATIONS

This application claims the benefit of Korean Patent Application No. 10-2013-0052046, filed with the Korean Intellectual Property Office on May 8, 2013, the disclosure of which is incorporated herein by reference in its entirety.

BACKGROUND

1. Technical Field

The present invention relates to an apparatus and a method for controlling traffic, more specifically to an apparatus and a method for controlling transmission rate of packets.

2. Background Art

With the increased popularity of wireless data communication services such as 3G, LTE networks, etc., services such as user streaming, P2P and mobile VoIP are generating large amounts of traffic. Particularly, since technologies and environments for implementing applications are different for each wireless terminal OS and type of terminal, there are differences in bit-rate transmission rate of packets.

Most mobile environments have the VOD and streaming services realized in downloading types of streaming, and a large amount of data are downloaded at the beginning of playing back, possibly overloading the mobile networks. Moreover, even if the user stops playing back the content while the content is being played back, the portion of the content that is not played back is also downloaded, unnecessarily causing a load in the network.

SUMMARY

The present invention provides an apparatus and a method for controlling traffic that control transmission rate of packets per service according to a terminal.

An aspect of the present invention provides an apparatus for controlling traffic, which includes: a communication unit configured to receive packets corresponding to a terminal; a service checking unit configured to check for a service corresponding to the packets by analyzing the packets; a terminal checking unit configured to analyze the packets and check a type of the terminal; a policy information storage unit configured to store policy information according to at least one of the service and the type of the terminal; and a traffic control unit configured to adjust a transmission rate of the packets corresponding to the service according to the policy information.

The type of the terminal can be determined based on at least one of an operating system installed in the terminal and an application corresponding to the packets.

The apparatus for controlling traffic can further include a policy information setting unit configured to measure Streaming Service QoS Bandwidth according to the service for the terminal and to generate policy information corresponding to at least one of the terminal and the service according to the Streaming Service QoS Bandwidth and store the generated policy information in the policy information storage unit.

In case there is no policy information according to at least one of the service and the type of the terminal, the traffic control unit can be configured to request the policy information setting unit for setting of new policy information and adjust the transmission rate of the packets corresponding to the service according to the new policy information.

Another aspect of the present invention provides a method for controlling traffic by an apparatus for controlling traffic that includes: receiving packets corresponding to a terminal; checking for a service corresponding to the packets by analyzing the packets; checking for a type of the terminal by analyzing the packets; storing policy information according to at least one of the service and the type of the terminal; and adjusting a transmission rate of the packets corresponding to the service according to the policy information.

The type of the terminal can be determined based on at least one of an operating system installed in the terminal and an application corresponding to the packets.

The method for controlling traffic can further include measuring Streaming Service QoS Bandwidth according to the service for the terminal and generating policy information corresponding to at least one of the terminal and the service according to the Streaming Service QoS Bandwidth.

The generating of the policy information can be carried out in case there is no policy information according to at least one of the service and the type of the terminal.

As described above, according to the present invention, it is possible to reduce unnecessarily generated traffic by controlling a transmission rate of packets according to a terminal.

DETAILED DESCRIPTION

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention.

When one element is described as "sending" or "transmitting" a signal to another element, it shall be construed as sending or transmitting the signal by having the one element connected to the other element directly but also by possibly having another element in between, unless otherwise described.

Figure 1:
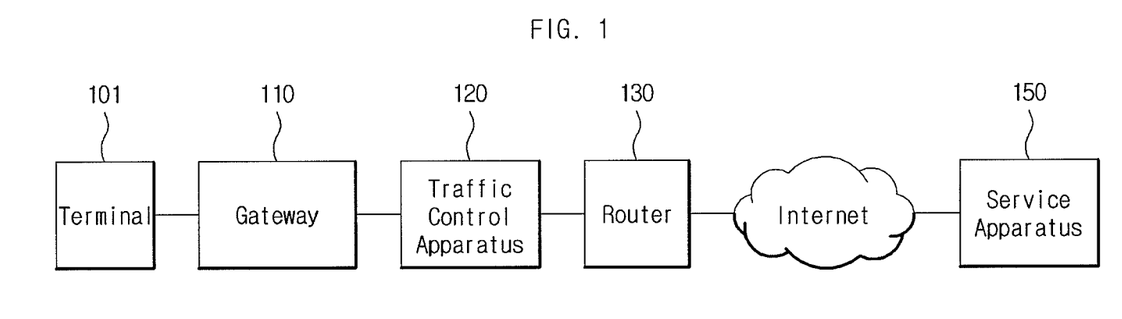
FIG. 1 is a block diagram briefly illustrating a system for controlling traffic that includes an apparatus for controlling traffic in accordance with an embodiment of the present invention.

FIG. 1 is a block diagram briefly illustrating a system for controlling traffic that includes an apparatus for controlling traffic in accordance with an embodiment of the present invention.

The system for controlling traffic in accordance with an embodiment of the present invention includes a terminal 101, a gateway 110, a traffic control apparatus 120 and a router 130.

The terminal 101 has an operating system installed therein and is connected to the Internet through the gateway 110, the traffic control apparatus 120 and the router 130 to transmit and receive data. Here, the terminal 101 can be a terminal having an operating system and applications that can use streaming services.

The gateway 110 relays transmission and reception of packets between the terminal 101 and the Internet. Here, it shall be appreciated by anyone ordinarily skilled in the art that the gateway 110 can be any of known gateways, such as S-GW (Serving Gateway), P-GW (Packet Data Network Gateway), SGSN (Serving GPRS Support Node) and GGSN (Gateway GPRS Support Node), which constitute a wireless communication network, and can be implemented as a plurality of apparatuses.

The traffic control apparatus 120 checks for a streaming service and the type of the terminal 101, by analyzing traffic based on packets communicated between the gateway 110 and the router 130. Moreover, the traffic control apparatus 120 checks whether the pertinent packets correspond to a streaming service, by analyzing the packets communicated between the gateway 110 and the Internet through a known packet inspection method. Moreover, in case the pertinent packets correspond to a streaming service, the traffic control apparatus 120 checks for the type of terminal through a known method of analyzing a subscriber terminal for the terminal 101 corresponding to the pertinent packets. Here, the type of terminal can be determined based on the operating system and applications, such as a web browser, installed in the terminal 101. For example, it is possible that a terminal having a first operating system and a first application installed therein is referred to as a first type, that a terminal having a second operating system and the first application installed therein is referred to as a second type, and that a terminal having the first operating system and a second application installed therein is referred to as a third type.

The traffic control apparatus 120 checks whether policy information, for example, a service policy for quality of service of deep packet inspection, is predetermined according to at least one of the streaming service and the type of the pertinent terminal 101. Here, in case there is traffic corresponding to each streaming service and each terminal 101, the traffic control apparatus 120 can have the policy information, which limits a transmission rate of packets to a predetermined level, pre-stored therein. Here, the policy information can be stored in the traffic control apparatus 120 as a predetermined form of data. In the case where the predetermined policy information is present, the traffic control apparatus 120 adjusts the rate of transmitting packets to the pertinent terminal 101 based on the policy information. In case there is no predetermined policy information, the traffic control apparatus 120 computes an appropriate bandwidth (Streaming Service. QoS Bandwidth) of the streaming service for the terminal 101 receiving the pertinent packets. The traffic control apparatus 120 generates the policy information corresponding to at least one of the pertinent terminal 101 and streaming service according to the Streaming Service QoS Bandwidth. For example, the traffic control apparatus 120 can measure a playback time of content by the streaming service and an overall quantity of downloaded packets and compute the Streaming Service QoS Bandwidth based on the playback time and quantity. The traffic control apparatus 120 can generate and store the policy information corresponding to the terminal 101 and the pertinent streaming service. The traffic control apparatus 120 adjusts the transmission rate of packets corresponding to the terminal 101 according to the configured policy information.

The router 130 transmits data received through the gateway 110 and the traffic control apparatus 120 to a service apparatus 150 through the Internet, and transmits data received from the service apparatus 150 to the terminal 101 through the traffic control apparatus 120 and the gateway 110. Here, the service apparatus 150 can be a server providing streaming services.

Figure 2:
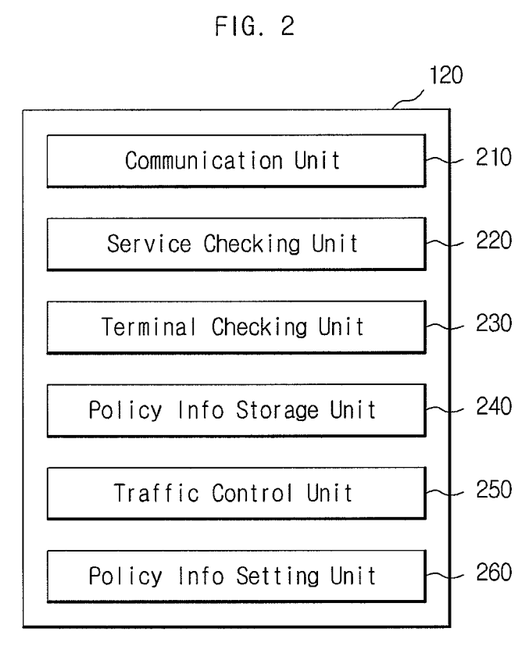
FIG. 2 is a block diagram illustrating the configuration of the apparatus for controlling traffic in accordance with an embodiment of the present invention.

FIG. 2 is a block diagram illustrating the configuration of the traffic control apparatus in accordance with an embodiment of the present invention.

Referring to FIG. 2, the traffic control apparatus 120 includes a communication unit 210, a service checking unit 220, a terminal checking unit 230, a policy information storage unit 240, a traffic control unit 250 and a policy information setting unit 260.

The communication unit 210 can be connected with the terminal 101 and the Internet through the gateway 110 and the router 130 to transmit and receive packets.

The service checking unit 220 can analyze the packets received through the communication unit 210 by use of the known deep packet inspection method and determines whether the pertinent packets correspond to a streaming service. For example, the service checking unit 220 analyzes the packets through the deep packet inspection method and determines whether the pertinent packets correspond to any one of predetermined streaming services. Here, the deep packet inspection method analyzes the packets up to layer 7, and the service checking unit 220 can check for information on the streaming service based on a result analyzed according to the deep packet inspection method.

The terminal checking unit 230 analyzes the packets received through the communication unit 210 by use of the known method of analyzing a subscriber terminal and checks for the type of the pertinent terminal. For example, through the deep packet inspection, the terminal checking unit 230 can extract information on the type of operating system of the terminal, the version of the operating system and the type of browser used by the terminal and check for the type of the terminal by referring to the pertinent information.

The policy information storage unit 240 stores policy information corresponding to at least one of terminal type and streaming service.

The traffic control unit 250 searches for the policy information corresponding to at least one of the streaming service, which is checked by the service checking unit 220, and the terminal type, which is checked by the terminal checking unit 230, and controls the transmission rate of the packets according to the searched policy information. Here, in case there is no policy information corresponding to at least one of the streaming service and the terminal type stored in the policy information storage unit 240, the traffic control unit 250 requests the policy information setting unit 260 for setting of new policy information.

The policy information setting unit 260 computes an appropriate bandwidth (Streaming Service QoS Bandwidth) of the streaming service for the terminal 101 according to the request of the traffic control unit 250. The policy information setting unit 260 generates the policy information corresponding to at least one of the pertinent terminal and streaming service according to the computed bandwidth, and stores the pertinent policy information in the policy information storage unit 240. For example, the policy information setting unit 260 measures a playback time of content by the streaming service and an overall quantity of the downloaded packets. The policy information setting unit 260 can compute the Streaming Service QoS Bandwidth based on the playback time and quantity according to the below Mathematical Equation 1.

$$\text{Streaming Service QoS Bandwidth} = \text{Overall Quantity}/\text{Playback Time} * k \qquad [\text{Mathematical Equation 1}]$$

Here, "k" is a predetermined constant. The policy information setting unit 260 generates the policy information for adjusting the transmission rate of the packets based on the Streaming Service QoS Bandwidth.

Afterwards, the traffic control unit 250 adjusts the transmission rate of the packets according to the newly set policy information.

Figure 3A:
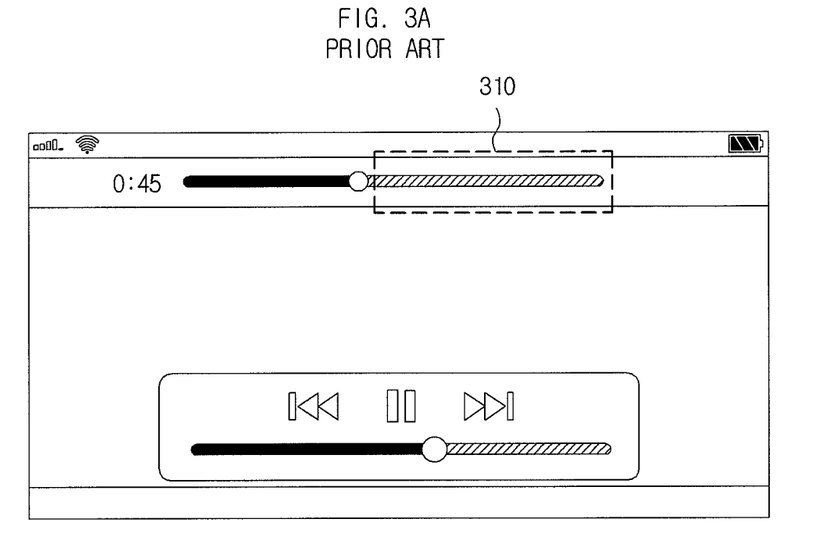
FIG. 3A shows a screen in which a conventional streaming service is provided.
Figure 3B:
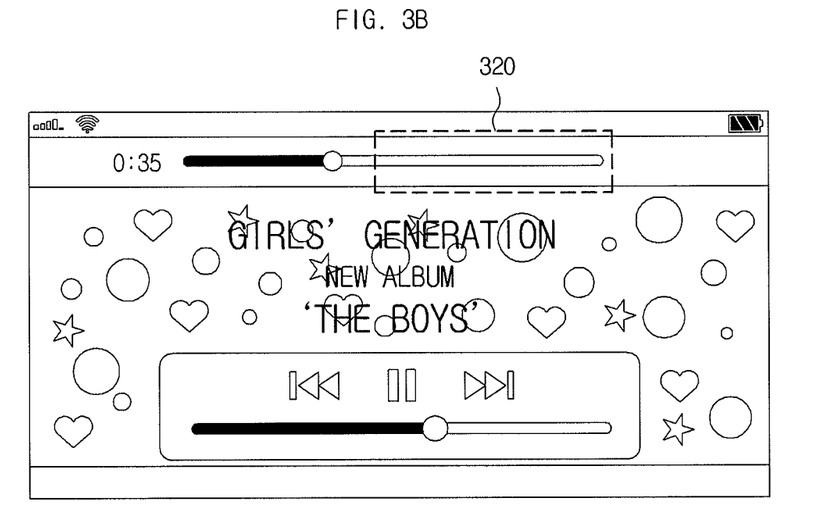
FIG. 3B shows a screen in which a streaming service is provided by the apparatus for controlling traffic in accordance with an embodiment of the present invention.

FIG. 3A shows a screen in which a conventional streaming service is provided, and FIG. 3B shows a screen in which a streaming service is provided by the traffic control apparatus in accordance with an embodiment of the present invention.

As indicated with reference numeral 310 in FIG. 3A, the transmission rate of packets for the streaming service is higher than necessary, and thus data beyond a current position have been all downloaded. If a user terminates the pertinent service after viewing streamed video up to a middle thereof, the data beyond the current position would have been meaninglessly downloaded. Accordingly, it is very likely that the conventional streaming service provided through a wireless network has unnecessary traffic occurred therein.

On the contrary, as indicated by reference numeral 320 in FIG. 3B, the streaming service provided by the system for controlling traffic in accordance with an embodiment of the present invention has the transmission rate of the packets adjusted by the traffic control apparatus 120, and thus the amount of packets downloaded by the streaming service is similar with the rate of playing back the video. Accordingly, although the user stops the service in the middle thereof, unnecessary traffic can be reduced. In other words, the streaming service provided by the traffic control apparatus in accordance with an embodiment of the present invention can allow the streamed video to be played back normally and reduce the data amount of the video downloaded for playing back beyond the current position.

As a result, the apparatus for controlling traffic in accordance with an embodiment of the present invention can reduce a load on the wireless communication network by reducing unnecessary traffic caused by the streaming service that generates a high rate of load in the wireless communication network. Moreover, by reducing the load in the wireless communication network, the overall quality of service provided through the wireless communication network can be improved.

Figure 4:
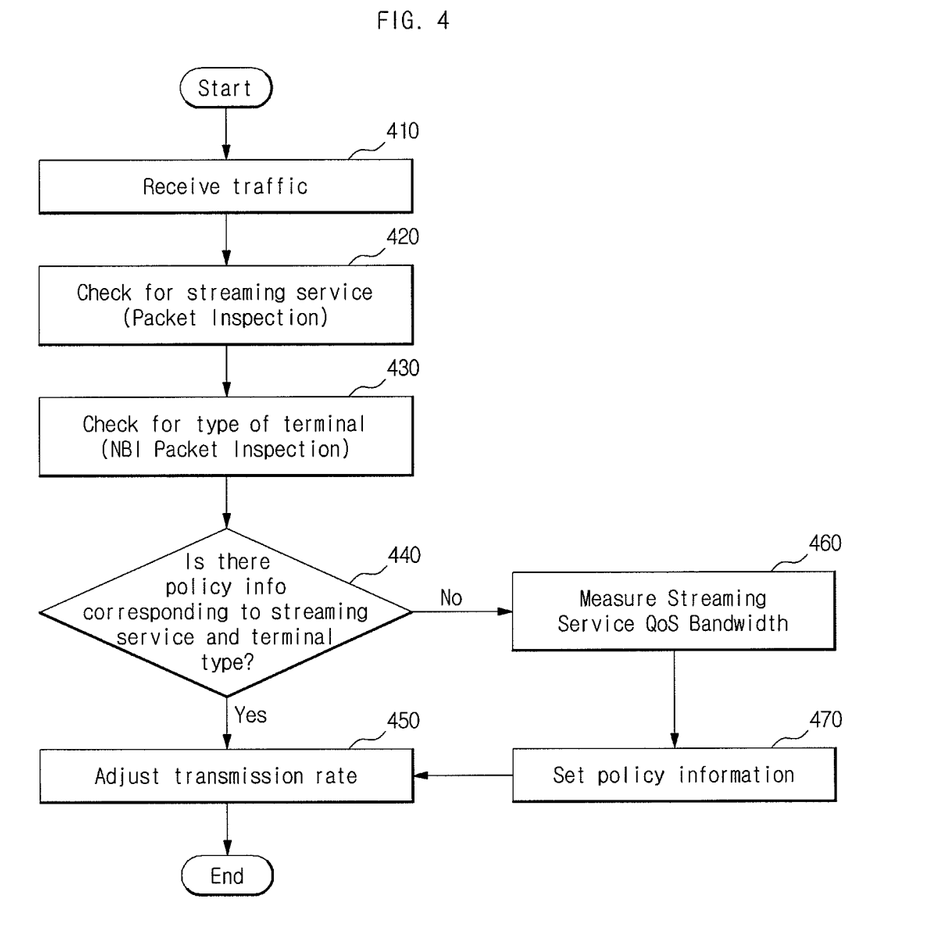
FIG. 4 is a flowchart illustrating a method for controlling service quality by the apparatus for controlling traffic in accordance with an embodiment of the present invention.

FIG. 4 is a flowchart illustrating a method for controlling service quality by the apparatus for controlling traffic in accordance with an embodiment of the present invention.

Referring to FIG. 4, in step 410, the traffic control apparatus 120 receives traffic transmitted by the terminal 101.

In step 420, the traffic control apparatus 120 analyzes the packets transmitted and received between the gateway 110 and the Internet by use of the known packet inspection method and determines whether the packets correspond to a streaming service.

In step 430, the traffic control apparatus 120 analyzes the traffic from the packets transmitted and received between the gateway 110 and the Internet by use of the known method of analyzing a subscriber terminal and checks for the type of the pertinent terminal.

In step 440, the traffic control apparatus 120 determines whether there is at least one of the streaming service and the terminal type checked in steps 420-430 in the pre-stored policy information.

If it is determined in step 440 that there is policy information, the traffic control apparatus 120 adjusts the transmission rate of the packets for the streaming service according to the policy information, in step 450.

If it is determined in step 440 that there is no policy information, the traffic control apparatus 120 measures the Streaming Service QoS Bandwidth of the streaming service for the terminal 101 receiving the pertinent packets.

Figure 5:
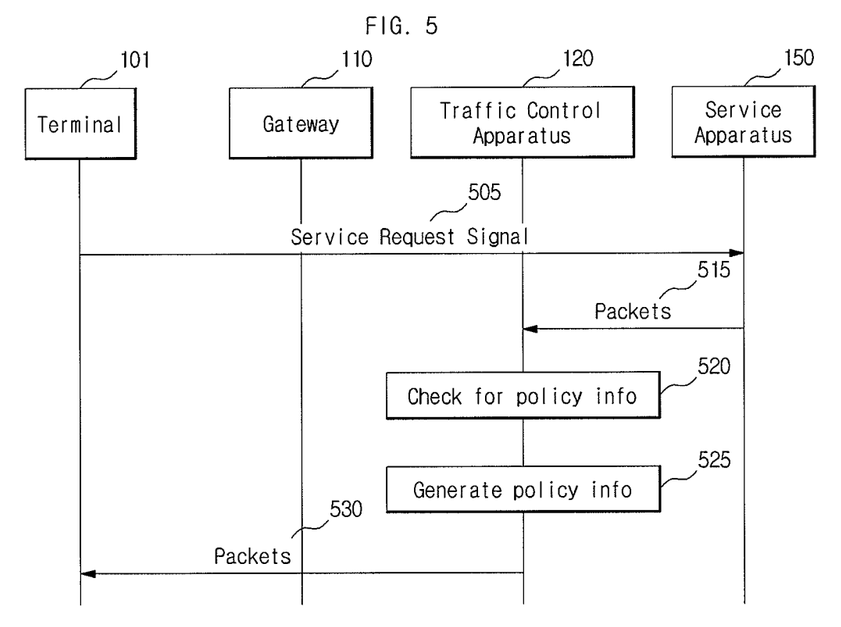
FIG. 5 is flow diagram illustrating how traffic is controlled for a streaming service for multiple terminals by a system for controlling traffic that includes the apparatus for controlling traffic in accordance with an embodiment of the present invention.

In step 470, the traffic control apparatus 120 generates the policy information corresponding to the pertinent terminal 101 according to the bandwidth and performs step 450, FIG. 5 is flow diagram illustrating how traffic is controlled for a streaming service for multiple terminals by a system for controlling traffic that includes the apparatus for controlling traffic in accordance with an embodiment of the present invention.

Referring to FIG. 5, in step 505, the terminal 101 transmits a service request signal for requesting a streaming service to the service apparatus 150 through the gateway 110 and the traffic control apparatus 120. Here, pursuant to the service request signal of step 505, a preparation process for providing the streaming service can be performed, for example, setting a session between the terminal 101 and the service apparatus 150 in a known method.

In step 525, the service apparatus 150 transmits packets to the traffic control apparatus 120 for providing the streaming service to the terminal 101 according to the service request signal received from the terminal 101.

In step 520, the traffic control apparatus 120 determines the type of the terminal 120 and the service provided by the service apparatus 150 by use of the deep packet inspection method and checks for policy information corresponding to the terminal type and the service.

If it is checked in step 520 that there is pertinent policy information, the traffic control apparatus 120 computes an appropriate bandwidth (Streaming Service QoS Bandwidth) for providing the streaming service and generates the policy information corresponding to the first terminal and the pertinent streaming service according to the appropriate bandwidth. The process for computing the bandwidth has been described above with reference to Mathematical Equation 1.

If it is checked in step 520 that there is pertinent policy information, or if the policy information is generated in step 525, the traffic control apparatus 120 transmits the packets to the terminal 101 in a transmission rate based on the policy information through the gateway 110, in step 530.

Accordingly, the terminal 101 can provide the streaming service by combining the packets received in the transmission rate controlled by the traffic control apparatus 120 and can reduce the amount of packets pre-received for playing back the video beyond the currently played image, as shown in FIG. 3B, thereby preventing unnecessary packets being transmitted through the communication network.

Figure 6:
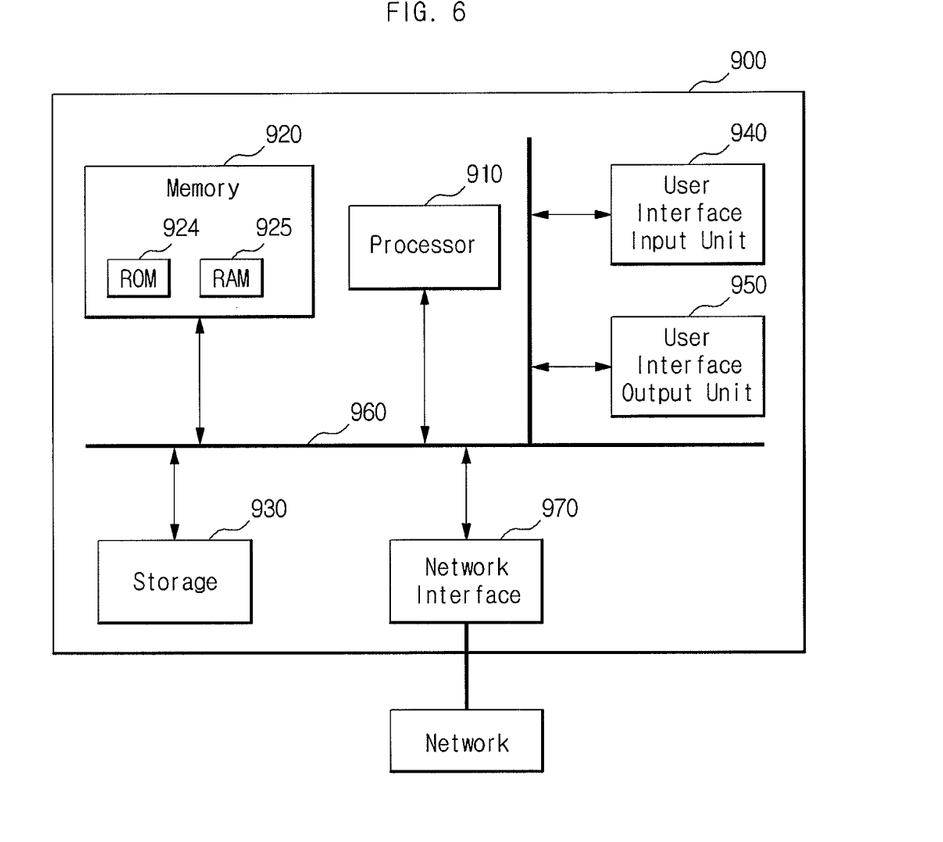
FIG. 6 illustrates how the apparatus for controlling traffic in accordance with an embodiment of the present invention is embodied in the form of a computer system.

FIG. 6 illustrates how the apparatus for controlling traffic in accordance with an embodiment of the present invention is embodied in the form of a computer system.

The above-described traffic control apparatus 120 may be implemented in a computer system, e.g., as a computer readable medium. As shown in FIG. 6, a computer system 900 may include one or more of a processor 910, a memory 920, a user interface input unit 940, a user interface output unit 950, and a storage 930, each of which communicates through a bus 960. The computer system 900 may also include a network interface 970 that is coupled to a network. The processor 910 may be a central processing unit (CPU) or a semiconductor device that executes processing instructions stored in the memory 920 and/or the storage 930. The memory 920 and the storage 930 may include various forms of volatile or non-volatile storage media. For example, the memory may include a read-only memory (ROM) 924 and a random access memory (RAM) 925.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

Hitherto, certain embodiments of the present invention have been described, and it shall be appreciated that a large number of permutations and modifications of the present invention are possible without departing from the intrinsic features of the present invention by those who are ordinarily skilled in the art to which the present invention pertains. Accordingly, the disclosed embodiments of the present invention shall be appreciated in illustrative perspectives, rather than in restrictive perspectives, and the scope of the technical ideas of the present invention shall not be restricted by the disclosed embodiments. The scope of protection of the present invention shall be interpreted through the claims appended below, and any and all equivalent technical ideas shall be interpreted to be included in the claims of the present invention.

What is claimed is:

1. An apparatus for controlling traffic, comprising:
   a communication unit configured to receive packets corresponding to a terminal;
   a service checking unit configured to check for a service corresponding to the packets by analyzing the packets;
   a terminal checking unit configured, to analyze the packets and check a type of the terminal;
   a policy information storage unit configured to store policy information according to at least one of the service and the type of the terminal;
   a traffic control unit configured to adjust a transmission rate of the packets corresponding to the service according to the policy information; and
   a policy information setting unit configured to measure streaming service QoS bandwidth according to the service for the terminal and to generate policy information corresponding to at least one of the terminal and the service according to the streaming service QoS bandwidth and store the generated policy information in the policy information storage unit,
   wherein, in case there is no policy information according to at least one of the service and the type of the terminal, the traffic control unit is configured to request the policy information setting unit for setting of new policy information and adjust the transmission rate of the packets corresponding to the service according to the new policy information.

2. The apparatus for controlling traffic of claim 1, wherein the type of the terminal is determined based on at least one of an operating system installed in the terminal and an application corresponding to the packets.

3. A method for controlling traffic by an apparatus for controlling traffic, the method comprising:
   receiving packets corresponding to a terminal;
   checking for a service corresponding to the packets by analyzing the packets;
   checking for a type of the terminal by analyzing the packet;
   storing policy information according to at least one of the service and the type of the terminal;
   measuring streaming service QoS bandwidth according to the service for the terminal and generating policy information corresponding to at least one of the terminal and the service according to the streaming service QoS bandwidth in case there is no policy information according to at least one of the service and the type of the terminal; and
   adjusting a transmission rate of the packets corresponding to the service according to the policy information,
   wherein the generating of the policy information is carried out in case there is no policy information according to at least one of the service and the type of the terminal.

4. The method for controlling traffic of claim 3, wherein the type of the terminal is determined based on at least one of an operating system installed in the terminal and an application corresponding to the packets.

\* \* \* \* \*